(12) United States Patent
Hamilton et al.

(10) Patent No.: US 6,176,517 B1
(45) Date of Patent: Jan. 23, 2001

(54) GAS GENERATING APPARATUS

(75) Inventors: Brian K. Hamilton, Littleton; Paul Harrington, Watkins; Charles B. Kafadar, Littleton, all of CO (US)

(73) Assignee: Autoliv ASPInc., Ogden, UT (US)

(*) Notice: Under 35 U.S.C. 154(b), the term of this patent shall be extended for 0 days.

(21) Appl. No.: 09/178,380

(22) Filed: Oct. 23, 1998

(51) Int. Cl.$^7$ .............................. B60R 21/26; C06D 5/00
(52) U.S. Cl. ........................ 280/736; 280/741; 102/289; 149/19.91; 149/36; 149/46
(58) Field of Search .................................. 280/736, 737, 280/741, 742, 729, 733; 149/46, 36, 19.91; 102/288, 289

(56) References Cited

U.S. PATENT DOCUMENTS

| | | | |
|---|---|---|---|
| 3,198,677 | 8/1965 | Thomas | 149/19 |
| 3,721,456 * | 3/1973 | McDonald | 280/736 |
| 3,942,820 * | 3/1976 | Lindblad | 280/733 |
| 3,954,528 | 5/1976 | Chang et al. | 149/19.4 |
| 4,220,087 | 9/1980 | Posson | 102/27 R |
| 4,696,705 | 9/1987 | Hamilton | 149/21 |
| 4,757,764 | 7/1988 | Thureson et al. | 102/312 |
| 4,838,165 | 6/1989 | Gladden et al. | 102/275.8 |
| 4,896,898 | 1/1990 | Lenzen et al. | 280/735 |
| 4,917,017 | 4/1990 | Beltz | 102/470 |
| 4,931,111 | 6/1990 | Poole et al. | 149/35 |
| 4,948,438 | 8/1990 | Patrick et al. | 149/38 |
| 4,948,439 | 8/1990 | Poole et al. | 149/46 |
| 4,950,458 | 8/1990 | Cunningham | 422/164 |
| 5,002,308 | 3/1991 | Lenzen et al. | 280/735 |
| 5,007,661 | 4/1991 | Lenzen | 280/735 |
| 5,060,973 | 10/1991 | Giovanetti | 280/736 |
| 5,066,039 | 11/1991 | Shitanoki et al. | 280/741 |
| 5,069,135 | 12/1991 | Johansson et al. | 102/380 |
| 5,078,422 * | 1/1992 | Hamilton et al. | 280/736 |
| 5,125,684 | 6/1992 | Cartwright | 280/736 |
| 5,139,588 | 8/1992 | Poole | 149/61 |

(List continued on next page.)

FOREIGN PATENT DOCUMENTS

| | | | |
|---|---|---|---|
| 1 446 880 | 2/1964 | (DE) . | |
| 1 214 584 | 4/1966 | (DE) . | |
| 39 32 576 A1 | 4/1991 | (DE) | C06D/5/00 |
| 411 6882 | 3/1992 | (DE) | B60R/21/20 |
| 41 26 743 A1 | 2/1993 | (DE) | B60R/21/22 |
| 41 34 995 C1 | 3/1993 | (DE) | B60R/21/16 |
| 430 52 91 | 9/1993 | (DE) | B60R/21/18 |
| 0 069 441 | 1/1983 | (EP) . | |
| 0 340 761 | 5/1989 | (EP) . | |
| 0 576 326 A1 | 6/1993 | (EP) . | |
| 0 591 119 A2 | 4/1994 | (EP) . | |
| 0 794 164 A1 | 9/1997 | (EP) . | |
| 210 9477 | 5/1972 | (FR) | B60R/21/00 |
| 2 226 638 | 11/1974 | (FR) . | |
| 2 536 065 | 11/1983 | (FR) . | |
| 1273748 | 11/1989 | (JP) | B60R/21/26 |
| 2081747 | 3/1990 | (JP) | B60R/21/26 |

*Primary Examiner*—J. J. Swann
*Assistant Examiner*—Christopher D Bottorff
(74) *Attorney, Agent, or Firm*—Sheridan Ross P.C.

(57) ABSTRACT

A gas generating apparatus for outputting a gas is provided. In one embodiment, the apparatus is an inflator having a propellant for supplying inflation gas(es) to an inflatable located in a vehicle. A confining member is located adjacent to the propellant. A number of spaced holes are provided in the confining member, either before or after activation of the propellant. Inflation gas is received through the spaced holes for subsequent passage to the inflatable. In that regard, the inflation gas first passes through a chamber defined in a timing member that has metering orifices. Such orifices regulate the flow of the inflation gas to the inflatable. The confining member is able to withstand significant pressures without rupturing. Each of the confining member and the timing member is preferably made of a non-metallic material. The propellant includes a fuel-rich material and an oxidizer material, preferably ammonium nitrate.

13 Claims, 7 Drawing Sheets

U.S. PATENT DOCUMENTS

| | | | |
|---|---|---|---|
| 5,145,209 | 9/1992 | Lenzen | 280/806 |
| 5,181,737 | 1/1993 | Lenzen et al. | 280/732 |
| 5,255,938 * | 10/1993 | Brede et al. | 280/736 |
| 5,267,513 | 12/1993 | Guirguis et al. | 102/475 |
| 5,269,561 * | 12/1993 | Davis et al. | 280/736 |
| 5,273,313 | 12/1993 | Klober et al. | 280/741 |
| 5,292,387 * | 3/1994 | Highsmith et al. | 149/19.1 |
| 5,324,075 | 6/1994 | Sampson | 280/736 |
| 5,348,344 | 9/1994 | Blumenthal et al. | 280/737 |
| 5,380,380 | 1/1995 | Poole et al. | 149/22 |
| 5,403,035 | 4/1995 | Hamilton | 280/736 |
| 5,439,250 * | 8/1995 | Kokeguchi et al. | 280/736 |
| 5,466,003 * | 11/1995 | Tanaka et al. | 280/733 |
| 5,487,851 | 1/1996 | Dillehay et al. | 264/3.3 |
| 5,495,807 | 3/1996 | Klober et al. | 102/289 |
| 5,507,891 | 4/1996 | Zeigler | 149/47 |
| 5,538,567 | 7/1996 | Henry, III et al. | 149/18 |
| 5,540,154 | 7/1996 | Wilcox et al. | 102/275.1 |
| 5,545,272 | 8/1996 | Poole et al. | 149/48 |
| 5,551,725 | 9/1996 | Ludwig | 280/737 |
| 5,553,889 | 9/1996 | Hamilton et al. | 280/736 |
| 5,641,938 | 6/1997 | Holland et al. | 149/48 |
| 5,677,510 | 10/1997 | Bucerius et al. | 149/45 |
| 5,723,812 | 3/1998 | Berteleau et al. | 149/46 |
| 5,734,123 | 3/1998 | Wheatley et al. | 149/19.7 |
| 5,747,730 | 5/1998 | Scheffee et al. | 149/47 |
| 5,780,768 | 7/1998 | Knowlton et al. | 149/36 |
| 5,783,773 | 7/1998 | Poole | 149/36 |
| 5,868,424 * | 2/1999 | Hamilton et al. | 280/741 |

* cited by examiner

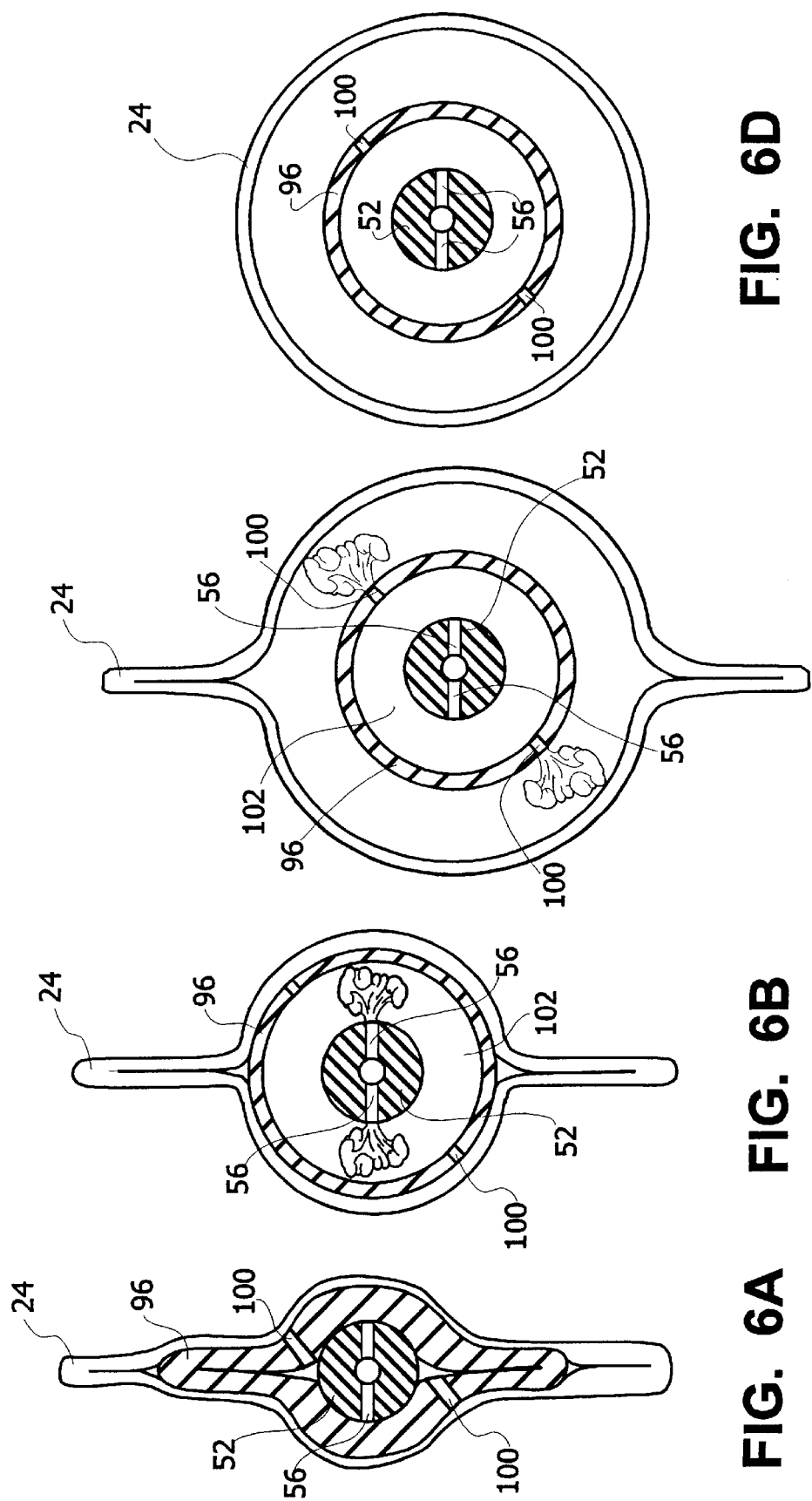

GAS GENERATING APPARATUS

FIELD OF THE INVENTION

The present invention relates to devices for producing a gas that can be used to perform a desired function such as inflating an air bag or inflatable in a vehicle.

BACKGROUND OF THE INVENTION

Systems that output one or more gases are known to utilize such gases for providing predetermined functions. For example, inflator systems are commonly used to inflate air bags in a vehicle. Inflators and accompanying air bag modules can be positioned at a number of different locations inside the vehicle, including adjacent the driver (driver side inflator), adjacent the front seat passenger (passenger side inflator), adjacent the sides of the driver and/or front seat passenger (side inflator) and above the side windows (curtain inflator). The design or configuration of each inflator depends on its location. For example, the driver side inflator is different in geometry from a passenger side inflator. Regardless of its location, a commercially acceptable inflator must have certain characteristics. Not only must an inflator properly supply inflation gases when activated to fill the air bag, the manufacture and assembly of the inflator should be as uncomplicated as feasible. Furthermore, the inflator must meet competitive cost requirements.

Notwithstanding the extensive number of inflators that have been advanced or devised for use in vehicles, the manufacturing/assembly and cost reduction benefits continue to be major objectives sought to be achieved in connection with the design and development of new inflators for use in vehicles. Consequently, it would be advantageous to provide inflators that meet such practical considerations, as well as provide other enhanced features. It would also be beneficial to apply such technology and features to applications other than vehicle inflators.

SUMMARY OF THE INVENTION

In accordance with the present invention, a gas generating apparatus is provided for generating at least one gas for a predetermined function. In one application, an inflator is provided that generates inflation gases for delivery to an inflatable or air bag. The inflator includes a propellant for generating the inflation gases when activated by an ignition assembly. In one embodiment, the propellant preferably is elongated, i.e., its length is substantially greater than its width. The ignition assembly is activated by a control signal indicative of the occurrence of a predetermined event related to vehicle impact or collision of at least a threshold force. When the propellant is elongated, it can be a number of elongated pieces of propellant or a single elongated piece. Regardless, each elongated propellant has a substantially greater length than its width and the ratio of length-to-width is greater than at least about 10, preferably about 100.

In one embodiment, the propellant has a porous composition that is sufficiently oxidized so that no unacceptable percentage of carbon monoxide and/or other toxic gases result after combustion of the propellant is completed. In this embodiment, the propellant includes a fibrous cellulose material or fibers to facilitate its extrusion and to promote the porosity of the propellant by minimizing shrinkage during drying. A cellulosic binder, such as hydroxypropylcellulose (HPC) dissolved in solvent such as alcohol, is used to suspend the solid ingredients and provide the appropriate rheology for extrusion. The HPC, together with the fibrous cellulose and a dispersal agent, constitute the binder system of the propellant, as well as fuels for the combustion reaction. The dispersing material or dispersal agent is also preferably used, in conjunction with the HPC, to prevent or substantially eliminate clumping of the fibrous cellulose component of the propellant composition when it is being formed. Hence, the HPC has at least two functions, namely, contributing to the binding of the propellant and assisting in the dispensing of the fibrous cellulose. The dispersing material can include a product identified as CELLULON®, which is available from NutraSweet/Kelco Company. This is a fibrous cellulose material having a much smaller fiber size than the fibrous cellulose ingredient. The propellant may also include one or more other additives, such as known stabilizers and/or anti-oxidants.

In another embodiment of a propellant composition, no binder system is utilized to bind first and second materials together. Such a propellant composition comprises the first material that includes a fuel-rich component as at least the primary component thereof. The fuel-rich component is a secondary explosive. This propellant composition also includes the second material that comprises an oxidizer material as at least the primary component thereof. Preferably, the primary component is ammonium nitrate. The first and second materials are mixed together and contained in the inflator housing. When desired or necessary, a force is applied to the mixture within the inflator housing to withstand transportation vibrations and/or avoid rattle.

The inflator includes a confining member or pressure tube that surrounds the elongated propellant. In one embodiment, the confining member includes a number of layers. A number of holes are spaced at predetermined distances from each other along the length of the confining member. In that regard, such spaced holes are preferably created when seals or weakened areas of the confining member rupture or open when the propellant is ignited. In another embodiment, the holes are present before the propellant is combusted. The confining member length is equal, or substantially equal, to the length of the elongated propellant. The confining member is preferably made of a non-metallic material that can withstand a pressure of at least 3,000 psi and preferably 4,000 psi and greater. The confining member has an inner wall and the elongated propellant has an outer surface, with a gap or space disposed between this inner wall of the confining member and the outer surface of the elongated propellant. In one embodiment, the elongated propellant has a center bore located through the center longitudinal axis of the propellant. Both the gap and the center bore, when present, affect or contribute to the propagation of a combustion wave along the length of the elongated propellant. That is, when the propellant is ignited at one end thereof, a combustion wave is created that results in the combustion of the elongated propellant along a linear path defined by the length thereof. Among other factors, propagation of the combustion wave is a function of the size of the gap and the center bore, if any. More particularly, the propagation of the combustion wave should be at least 0.1 meter/msec. In conjunction with meeting this parameter, the ratio of the cross-sectional area of the propellant to the cross-sectional area of the inner diameter of the confining member must be within a particular range. This ratio is in the range of about 0.10–0.60.

In one embodiment, the inflator further includes a timing member or tube that houses at least substantial portions of the confining member and propellant. The timing tube can be rigid or it can be flexible, e.g., made of a coated fabric or the like. The timing member controls flow of inflation gases to the air bag or inflatable. In that regard, the timing member includes one or more orifices through which inflation gases can pass when the propellant is ignited and products of combustion, including the inflation gases, are generated. The timing member regulates flow of the inflation gases to the inflatable at a desired rate. In the absence of the timing member, the inflation gases generated by the propellant contemplated by the present invention might result in an unacceptable rapid filling or pressurization of the inflatable with the inflation gases. If such an inflator were activated in a vehicle, the occupant experiencing such a rapid filling of the inflatable with inflation gases could be subject to a greater than desired pressure. Preferably, a number of orifices are formed along the length of the timing member. Because of the relatively rapid propagation of the combustion wave, inflation gases flow from the pressure tube into the timing tube very rapidly to fill the timing tube to a peak pressure. These gases stored in the timing tube can then readily pass through each of such orifices in the timing tube at substantially the same rate, with the time of passage of inflation gases through such orifices being relatively independent of the propagation rate in the pressure tube. The inflatable surrounds the timing member and therefore receives such inflation gases along its length at substantially the same rate to uniformly fill the inflatable along its length at substantially the same time. This uniform receipt of inflation gases results in the inflator itself filling the entire inflatable. Such filling is in contrast to certain portions of the inflatable being filled by other portions thereof using the inflation gases that have been received at one end of the inflatable and are caused to move to other parts of the inflatable by additionally received inflation gases. Like the confining member, the timing member is also preferably made of a non-metallic material that reduces its cost and package size.

In operation, the ignition assembly is activated which ignites the propellant near one end thereof. Propagation of the combustion wave along the length of the propellant occurs. Inflation gases are generated and pass through holes in the confining member. The confining member is sufficiently strong to resist any structural rupturing or breaking thereof, as well as there being little, if any, noticeable combustion of the confining member. Inflation gases that pass through the confining member holes enter the space or area between the outer surface of the confining member and the inner wall or surface of the timing member. Inflation gases reach the orifices in the timing member and are metered through them to fill the inflatable.

Based on the foregoing summary, a number of salient aspects of the present invention are readily discerned. The gas generating apparatus produces one or more gases and can be readily incorporated into any one of a number of systems that utilize the resulting gas. In one area of application, the gas generating apparatus is an inflator used in a vehicle that generates inflation gases. Such an inflator has fewer, less expensive parts, which are easily assembled and manufactured. The cost of the inflator is reduced in view of the relatively fewer parts. Propagation of a combustion wave associated with the generation of the inflation gases is controlled using the confining member that can withstand substantial pressures without rupturing. The confining member has a number of spaced holes that are present before and/or after activation of the propellant through which the inflation gases escape. Such holes increase in size after propellant ignition. The propagation rate has a sufficient magnitude to properly inflate the air bag or other inflatable. In addition to having fewer parts, the confining member and the timing member can be made of non-metallic materials thereby also reducing the cost of the inflator. Particularly when an elongated propellant is included, uniform filling of an elongated inflatable is achieved through the use of the spaced orifices in the timing member, which regulate the flow of inflation gases in connection with filling the inflatable. The propellant has a composition that is sufficiently oxidized to avoid the presence of toxic gases after combustion is completed. Such a propellant preferably includes fibrous cellulose or other porosity producing component(s), together with a dispersal agent. The fibrous cellulose is beneficial in providing a rigid but porous propellant composition that is readily extrudable, while the dispersal agent is advantageous in avoiding unwanted clumping and an improper mixture of the propellant composition. Such porosity is highly beneficial when the propellant includes ammonium nitrate.

Further inventive aspects may be included:

A method for inflating an inflatable comprising: providing an inflator with propellant in which said propellant has a length and a width with said length being substantially greater than said width;

igniting said propellant and with said igniting step including propagating and ignition of said propellant along said propellant length at a propagation rate of at least about 0.1 meter of propellant/msec;

generating an inflation gas with said igniting of said propellant; and filling said inflatable with the inflation gas substantially uniformly along all of the length of the inflatable.

A method wherein said providing step includes providing said propellant with said length being at least about said width.

A method wherein said providing step includes locating a confining member having spaced holes outwardly of said propellant and said filling step includes controlling passage of the inflation gas using said confining member and said holes.

A method wherein said filling step includes regulating passage of the inflation gas to the inflatable by causing the inflation gas to be received within a timing member for passing into the inflatable through a plurality of metering orifices formed in said timing member.

A method wherein said providing step includes providing said propellant having said length of at least about ½ the length of the inflatable bag.

A method wherein said filling step includes allowing passage of the inflation gas through spaced holes in a confining member surrounding said propellant and in which substantially all of the inflation gas escapes through said holes.

A method wherein said filling step includes expanding sizes of said holes after said igniting step.

Additional advantages of the present invention will become readily apparent from the following discussion, particularly when taken together with the accompanying drawings.

BRIEF DESCRIPTION OF THE DRAWINGS

FIGS. 6A–6D are cross-sectional views of the inflator that schematically illustrate flow of inflation gases to an inflatable when the propellant is activated;

DETAILED DESCRIPTION

Figure 1:
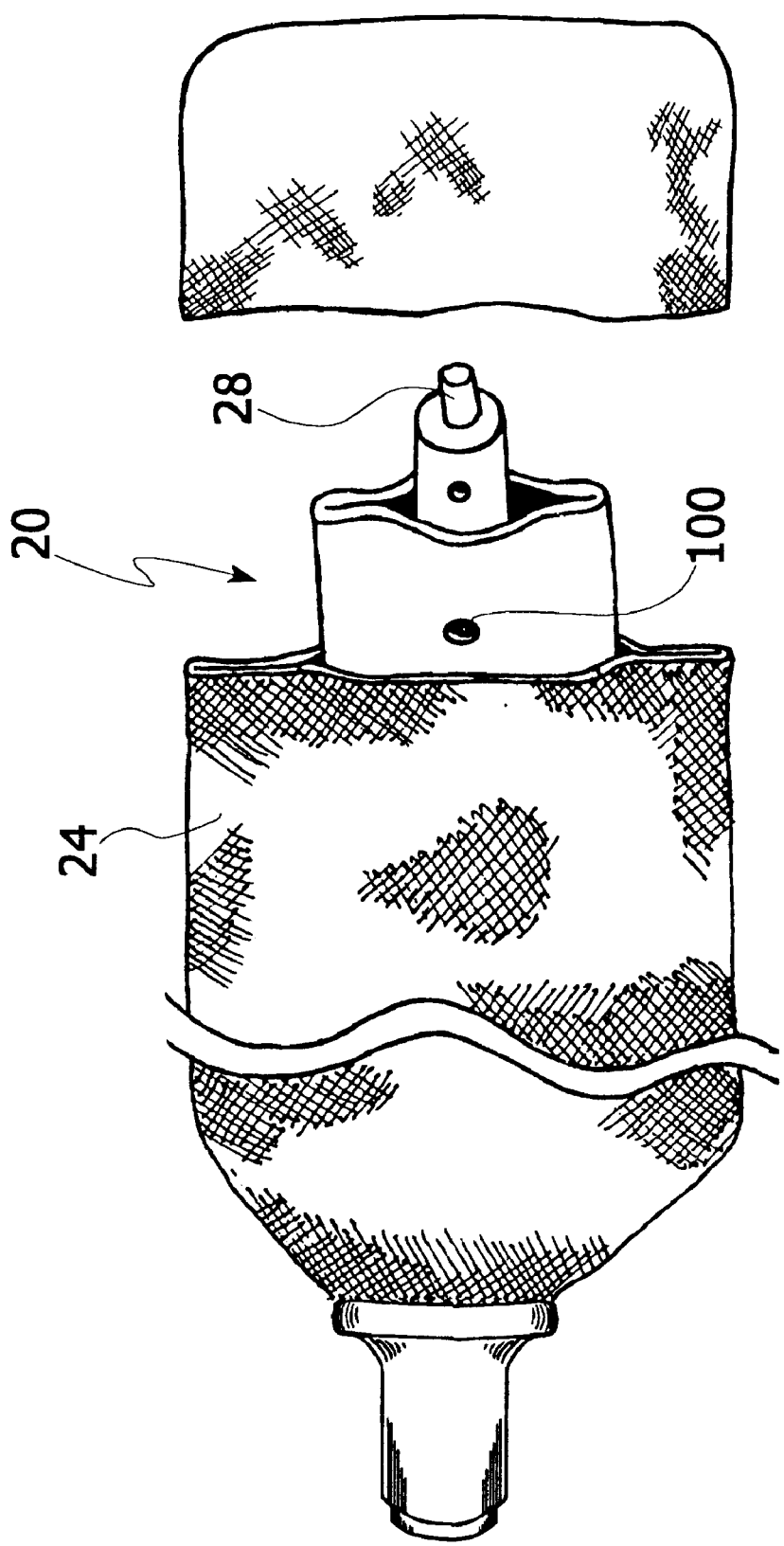
FIG. 1 is a perspective view schematically illustrating the inflator of the present invention within an inflatable or air bag.

The present invention is described in greater detail in the context of embodiments related to inflators for use in a vehicle, although the features and functions of the gas generating apparatus are suitable for other applications. With reference to FIG. 1, an inflator 20 is schematically illustrated for use with an inflatable or air bag 24. In one embodiment, the inflator 20 includes an elongated propellant 28. When ignited, the propellant 28 combusts and generates products of combustion including inflation gases that are used to inflate the air bag 24. The inflator 20 and the air bag 24 are located within a vehicle. The inflated air bag 24 is useful in protecting the vehicle occupant against serious injury.

The propellant composition can include a number of different materials, provided that such a composition achieves a number of objectives. These include generation of a sufficient inflation gas yield for pressurizing the inflatable 24; a resulting temperature after ignition of the propellant that is within an acceptable range (not too great a resulting temperature); and the products of combustion after activation of the propellant must be stoichiometrically balanced, e.g., no unacceptable amounts of carbon monoxide (CO) should be part of such combustion products (sufficiently oxidized). In that regard, the propellant composition need not be one that has a "smokeless" result after activation. In one embodiment, as will be described later herein, a further objective of the propellant composition relates to its ability to propagate ignition down a relatively long confining member or pressure tube that surrounds the propellant.

With regard to the composition of the propellant 28, it is characterized by being part of a pure pyrotechnic inflator. A pure pyrotechnic inflator refers to an inflator in which substantially entirely all gases provided by the inflator are propellant gases generated by the solid gas-generating propellant 28. For a pure pyrotechnic inflator, there is no need to store a pressurized gas or medium and the inflator is free of, or does not have, a stored, pressurized gas. Preferably, the propellant 28 has a composition that is substantially free of metals so that the propellant gases are substantially free, or in the absence of, metal-containing particulate and/or condensable materials, eliminating the need for a filter to remove any such particulate and/or condensable materials. Furthermore, in a preferred embodiment, the propellant 28 is substantially free of halogen-containing materials so that the propellant gases are substantially free, or in the absence of, halogen-containing components.

In a preferred embodiment, the composition of the propellant includes at least a fuel-rich material, an oxidizer material and a porosity producing material, which has one or more components that also constitute a binder system of the propellant. The fuel-rich material refers to a material that contains oxygen in its molecular structure, if at all, in an amount that is smaller than a stoichiometric amount of oxygen that would be required, during a self-sustained combustion reaction, to convert all hydrogen that may be in the fuel-rich material to water and to convert all carbon that may be in the fuel-rich material to carbon dioxide. If the fuel-rich material were combusted alone, it would produce gaseous decomposition products including a significant amount of carbon monoxide and/or hydrogen, both of which are undesirable for purposes of inflating an inflatable or air bag located in a vehicle. In one embodiment, the fuel-rich material has a primary component that is a majority, by weight, of the fuel-rich material. In one embodiment, the primary component of the fuel-rich material is a gun-type propellant. Gun-type propellants, as used herein, constitute secondary explosives and are high-temperature, fuel-rich components such as single, double, or triple-based propellants and nitramine propellants such as LOVA (low vulnerability ammunition) and HELOVA (high energy, low vulnerability ammunition) propellants. Such gun-type propellants have a combustion temperature in the range from about 2500° K. to about 3800° K. and typically greater than about 3000° K. Examples of suitable gun-type propellants include nitramine-based propellants having as major ingredients RDX (also known as hexahydrotrinitrotriazine or cyclotrimethylene trinitramine) or HMX (also known as cyclotetramethylenetethranitramine). PETN (also known as pentaerythritol tetranitrate) and TAGN (also known as triaminoguanadine nitrate) could also serve as major ingredients in gun-type propellants. Other suitable gun-type propellants include those incorporating tetrazole-based compounds and triazole-based compounds, particularly five-aminotetrazole. Another fuel-rich material that is acceptable is nitroguanidine, which is the preferred primary component of the fuel-rich material for inflators having lengths comparable to their widths. It is preferred because nitroguanidine has a characteristic burn rate exponent (n) that is less than 1, unlike fuel-rich materials that have a characteristic burn rate exponent of about 1, e.g., RDX or HMX. For fuel-rich materials with an exponent of about 1, there is substantially greater difficulty in controlling their combustion stability. For inflators having their lengths about five times greater than their widths, on the other hand, fuel-rich materials with n equal to, or substantially equal to, 1 (e.g. RDX and HMX) are preferred in order to sustain combustion. Regardless of which fuel-rich material is employed, the amount, by weight, of the secondary explosive of the fuel-rich material in the propellant 28 is preferably at least 5% and, preferably, no greater than about 30% of the propellant 28.

The oxidizer material is preferably a nitrate compound that is free of metal-containing constituents so that the propellant gases, which are generated when the propellant 28 is combusted, are substantially free, or in the absence of, metal-containing particulate and/or condensable materials. The oxidizer material provides oxygen for oxidizing decomposition products of the fuel-rich material so that at least some of the hydrogen and/or carbon monoxide generated by the fuel-rich material during a combustion reaction will be oxidized to water and/or carbon dioxide, respectively. The oxidizer material of the propellant 28 is defined as a material capable of supplying oxygen to increase the ultimate yield of carbon dioxide and/or water from combustion products of the fuel-rich material and thereby reduce the ultimate yield of carbon monoxide and/or hydrogen from combustion of the fuel-rich material. More preferably, the oxidizer material comprises only elements selected from the group consisting of carbon, oxygen, nitrogen and hydrogen and, most preferably, the oxidizer material comprises only the elements of nitrogen, oxygen and hydrogen. Examples of preferred materials for use as the oxidizer material include oxygen-containing ammonium salts, such as ammonium nitrate and ammonium dinitramide. Ammonium nitrate is the particularly preferred oxidizer material. The amount of oxidizer material in the propellant, by weight, is in the range of about 50%–90%.

The porosity producing material that includes a binder system of the propellant 28 is provided to accommodate the phase change that the oxidizer material, such as ammonium nitrate, undergoes when subject to temperature changes, such as numerous temperature cycling from less than −30° C. to more than 80° C., e.g. 15 or more of such cycles. Ammonium nitrate undergoes a crystalline phase change and also a volume change accompanying the phase change during normal storage conditions. The porosity producing material provides a porous propellant composition when mixed or otherwise combined with the other materials of the propellant 28 so that the porosity, by volume, of the resulting propellant 28 is at least about 15% and, preferably, in the range of about 15%–40% (about 85%–60% of theoretical density). The porosity producing material preferably includes naturally occurring fibrous cellulose. Fibrous cellulose is a commonly available component, such as that available from pulp board or wood pulp that is typically used in paper making processes. The fibrous cellulose is comprised of a number of fibrous cellulose pieces or fibers. Each of the pieces has a length and a width and the lengths of the fibrous cellulose pieces are at least five times greater than their widths. In that regard, the widths of the fibrous cellulose pieces are in the range of about 2.5 microns–250 microns and the lengths of the fibrous cellulose pieces are in the range of about 1,000 microns–10,000 microns. The fibrous cellulose pieces are also different from non-fibrous cellulosic material such as nitrocellulose, cellulose acetate, and cellulose acetate butyrate. Consequently, fibrous cellulose or any fibrous cellosic material is included in a group that is acceptable as a component of the porosity producing material, while non-fibrous cellulosic materials are excluded from the group of acceptable components of the porosity producing material.

With respect to the binder system of the porosity producing material, it preferably includes hydroxypropyl-cellulose (HPC), although other known or conventional binder products could be utilized. The HPC contributes to suspending the solid ingredients of the propellant composition in connection with providing the appropriate rheology for extrusion. Other contributors to the binder system are the fibrous cellulose and a dispersal agent.

In addition to being part of the binder system, the dispersal agent is included in the propellant composition and works together with the HPC (or other appropriate component) for preventing unwanted agglomerating or clumping of the fibrous cellulose during the mixing process with other materials of the propellant 28. In particular, it has been observed or determined that, when mixing the materials to form the propellant 28, unwanted clumping or gathering of the fibrous cellulose into "balls" occurs. Such clumping is not acceptable in providing a uniform propellant composition. It is known to utilize a relatively large amount of carrier fluid, such as a solvent (e.g. alcohol based), in connection with mixing the propellant materials. However, prior to extruding or completing the formation of the propellant or propellant pieces, it is necessary to remove or evaporate the carrier fluid. This adds considerably to the cost and time involved with the propellant manufacturing process. In order to eliminate or substantially reduce these costly steps, while avoiding unacceptable clumping of the fibrous cellulose, a dispersal agent has been identified that disperses fibrous cellulose or otherwise prevents the fibrous cellulose from clumping together during the mixing process. Although not intended to be limited to a particular theory, it is believed that the dispersal agent acts in somewhat of a mechanical manner to separate or maintain separation of fibrous cellulose particles or pieces. The sizes of the dispersal agent pieces are substantially smaller than the sizes of the fibrous cellulose pieces. Preferably, the widths or diameters of the fibrous cellulose pieces are at least five times greater than the widths or diameters of the dispersal agent pieces. In one embodiment, the widths of the dispersal agent pieces are in the range of about 0.05–0.5 micron. In a preferred embodiment, the dispersal agent includes a product identified as CELLULON®.

Yet another preferred component of the porosity-producing material is a viscous liquid carrier that includes a solution of a plastic polymer and a solvent, for example, a solution of about 10%–30% by weight of the HPC and about 90%–70% by weight of alcohol or alcohol-water azeotrope. The liquid carrier facilitates the dispersal of the first and second components into a dough-like mixture. This provides the appropriate rheology for extrusion of the propellant.

Optionally, the porosity producing composition also includes colorant in substantially minor amounts. When included, the colorant functions to distinguish propellant configurations or lots.

When making the propellant 28, the fuel-rich material, the oxidizer material and the porosity producing composition including binder system are mixed together using a conventional and known process. Subsequent to the mixing, propellant 28 or propellant pieces are extruded. The formed propellant is a uniform or homogenous mixture or combination of the included materials. After extrusion, each propellant piece has a uniform composition throughout its length, with the fibrous cellulose pieces or fibers essentially remaining the same size that they had before being mixed with the other of the propellant components. In particular, throughout the entire cross-section of any selected cross-section of a propellant piece or propellant 28, there is a substantially uniform mixture of the included materials. For example, for each selected cross-section along the length of the propellant 28, any at least 1,000-micron portion of any selected cross-section has the same homogenous composition as any other at least 1,000-micron portion of the same selected cross-section. Such a uniform mixture or composition may be found in any 100-micron portion of the same selected cross-section of the propellant 28.

EXAMPLES

Example 1

A solid gas-generating propellant composition is comprised of the following materials or components, by weight percentage:

| | |
|---|---|
| Ammonium Nitrate (200 mesh) | 53.00% |
| Strontium Nitrate (200 mesh) | 15.00% |
| RDX (20 micron, screened 200 mesh) | 20.00% |
| Cellulose (estercell) 1861 | 5.00% |
| Cellulon (16.8% solids) | 2.00% |
| Hydroxypropylcellulose (medium grade) (HPC) | 5.00% |
| Colorant | 0.01% |

The components or materials of such a propellant are mixed with solvent comprising 90% n-propyl alcohol and 10% water. The solvent comprises about 18% of the mixture weight. From this mixture that includes the solvent and water, propellant pieces can be extruded. The extruded propellant is semi-rigid but has a porosity characteristic or property, with the porosity being at least about 15% by volume and preferably about 40%. This property of the propellant accommodates thermal expansion due to crystalline phase changes of the ammonium nitrate without sacrificing the desired degree of rigidity. The binder system of the propellant includes the cellulose, the HPC and the CELLULON® product. The HPC is an alcohol soluble polymer and contributes desired viscosity to the propellant composition in connection with providing the desired extruded propellant pieces.

Example 2

Like Example 1, the propellant 28 composition includes RDX as the fuel-rich material. The materials or components, by weight, for this example are as follows:

| | |
|---|---|
| Ammonium Nitrate (200 mesh) | 70.00% |
| RDX (20 micron, screened 200 mesh) | 20.00% |
| Cellulose (estercell) 1861 | 4.50% |
| Cellulon (16.8% solids) | 1.00% |
| Hydroxypropylcellulose (medium grade) (HPC) | 4.50% |
| Methyl violet | 0.01% |

The propellant of Example 2 meets thermal stability requirements and temperature cycling tests, as does the propellant of Example 1. In particular, each of these two propellant compositions remains functional in the inflator with which they are used, after being subjected to a temperature of 107° C. for a period of 400 hours. Such functionality means that the propellant ignites when acceptably exposed to an appropriate signal, after being subjected to such time and temperature conditions. With regard to temperature cycling tests, the propellant remains functional when it is subjected to a number of cycles of temperature changes between temperatures that are greater than 80° and less than −30° C.

Example 3

The propellant 28 of this example is characterized by replacement of RDX as the fuel-rich material by one or more other secondary explosives and, in this case, by nitroguanidine.

| | |
|---|---|
| Ammonium Nitrate (200 mesh) | 80.00% |
| 1-Nitroguanidine | 9.00% |
| Cellulose (estercell) 1861 | 6.00% |
| Cellulon (16.8% solids) | 1.00% |

-continued

| | |
|---|---|
| Hydroxypropylcellulose (medium grade) (HPC) | 4.00% |
| Methyl violet | 0.01% |

In addition to the nitroguanidine as a replacement for RDX, the secondary explosives of HMX, PETN, or the like could be utilized. The HPC could be replaced by other organic binders, such as other cellulose esters, vinyl acetate and/or polyvinyl alcohol, acrylic polymers and the like.

Example 4

Another propellant 28 that includes 1-nitroguanidine as the primary component of the fuel-rich material has the following materials or components:

| | |
|---|---|
| Ammonium Nitrate (200 mesh) | 77.50% |
| 1-Nitroguanidine | 15.00% |
| Cellulose (estercell) 1861 | 3.50% |
| Cellulon (16.8% solids) | 1.00% |
| Polyacrylate polymer | 3.00% |
| Colorant | 0.01% |

Like the propellant compositions of Examples 1 and 2, the propellants of Examples 3 and 4 also pass thermal stability testing. It is also noted that each of the propellant compositions of Examples 1–4 can be used in varied and differently configured pure pyrotechnic inflators. In that regard, such propellant compositions can be used in known or conventional pyrotechnic inflators, as well as the new pyrotechnic inflator designs disclosed later herein. Additionally, although polyocrylate is the binder component used in this example, other conventional or known binders could be employed such as polyurethane and HTPB.

In one embodiment of a propellant composition, no binder system is employed to bind a first material that includes a fuel-rich component as the primary component (majority by weight) and a second material that includes an oxidizer as the primary component (majority by weight). With respect to this embodiment, it is inapplicable and not intended to be utilized with the inflator embodiments described later herein, particularly those embodiments that have the confining member. The first material is preferably in the form of propellant grains and the second material is preferably in the form of oxidizer particles, such as prills. In this embodiment, the propellant grains are mixed with the oxidizer particles without any binder components, such as the polymeric binder (e.g., HPC), fibrous cellulose and/or dispersal agent to hold them together. However, a binder can be used in forming the propellant grains themselves that typically include more than the fuel-rich component. In this embodiment, the propellant grains and the oxidizer particles are separate from, but adjacent to, each other while contained in the inflator housing. The propellant grains and the oxidizer particles are combined or loosely mixed with each other when they are contained in the inflator housing. Each of the propellant grains can be defined as having an outer surface area and all of the propellant grains in the inflator housing can be defined as having a total outer surface area. Similarly, each of the oxidizer particles can be defined as having an outer surface area and all of the oxidizer particles in the inflator housing can be defined as having a total outer surface area. All, or substantially all, of the total outer surface area of the propellant grains is exposed to all, or substantially all, of the total outer surface area of the oxidizer particles. While the propellant grains and the oxidizer particles are contained in the inflator housing, and where they are mixed together, spaces are defined among the propellant grains and the oxidizer particles and such spaces are free of any binding component or material. Hence, the propellant grains and the oxidizer particles are contained in the inflator housing independently of binder material. In one embodiment, when appropriate or necessary to ensure that the propellant grains and the oxidizer particles are maintained in the inflator housing in desired positions relative to each other, a force or pressure is applied to the mixture of the propellant grains and the oxidizer particles. Such an applied force is sufficient to withstand transportation vibrations and avoid rattle that can occur. A mechanical member, such as a spring-type member, or other means, can be utilized in maintaining the desired relative positions of the propellant grains and the oxidizer particles in the inflator housing. In one embodiment, particularly as it relates to a driver side inflator, a force applying member is located at the end of the inflator housing having an initiator assembly and the mixture of propellant grains and oxidizer particles is located inwardly of this force applying member. The force applying member can include a number of embodiments such as a spring, a foam element and/or a fiber material, for example. In such an embodiment, all contact between the propellant grains and the oxidizer particles is between the exposed outer surfaces of the plurality of oxidizer particles and the plurality of propellant grains.

With respect to the constituents of the propellant grains and the oxidizer particles, they can be the same as previously described herein in connection with other embodiments, except that there is no binder system to bind the propellant grains and the oxidizer particles together.

Other examples of this embodiment are next provided.

Example 5

In this example, the propellant composition includes the following:

| Component | Wt. % | Relative Parts (Propellant Grains) | Relative Parts (Oxidizer Particles) |
|---|---|---|---|
| Nitroguanidine | 43.5% | 30 | — |
| Strontium Nitrate | | 15 | — |
| Acrylate Binder | | 5 | — |
| Ammonium Nitrate | 46.5% | — | 100 |

The primary, fuel-rich component is nitroguanidine. The strontium nitrate is included to assist in desired burning of the propellant grains. The acrylate binder is beneficial in forming the extruded propellant grains and binding together the components of the propellant grains. When subjected to a standard vented bomb test, the propellant composition of Example 5 functioned satisfactorily and performed comparably to known propellant compositions used with vehicle inflators.

Example 6

This example is similar to Example 5, with the propellant composition including the following:

| Component | Wt. % | Relative Parts (Propellant Grains) | Relative Parts (Oxidizer Particles) |
|---|---|---|---|
| Nitroguanidine | 40% | 30 | — |
| Strontium Nitrate | | 15 | — |
| Acrylate Binder | | 5 | — |
| Ammonium Nitrate | 60% | — | 100 |

The propellant composition of this example was subjected to a closed bomb test that included a loose mixture of the propellant grains and the ammonium nitrate prills. Similar to the results of the testing associated with Example 5, the propellant composition of this example functioned satisfactorily and performed in a way comparable to known propellant compositions under equivalent tests. Although Examples 5 and 6 are described in terms of no binder system being employed to bind the propellant grains and the oxidizer particles, it should be understood that these two examples, like Examples 1–4, could incorporate a binder system like that disclosed in Examples 1–4.

Figure 2:
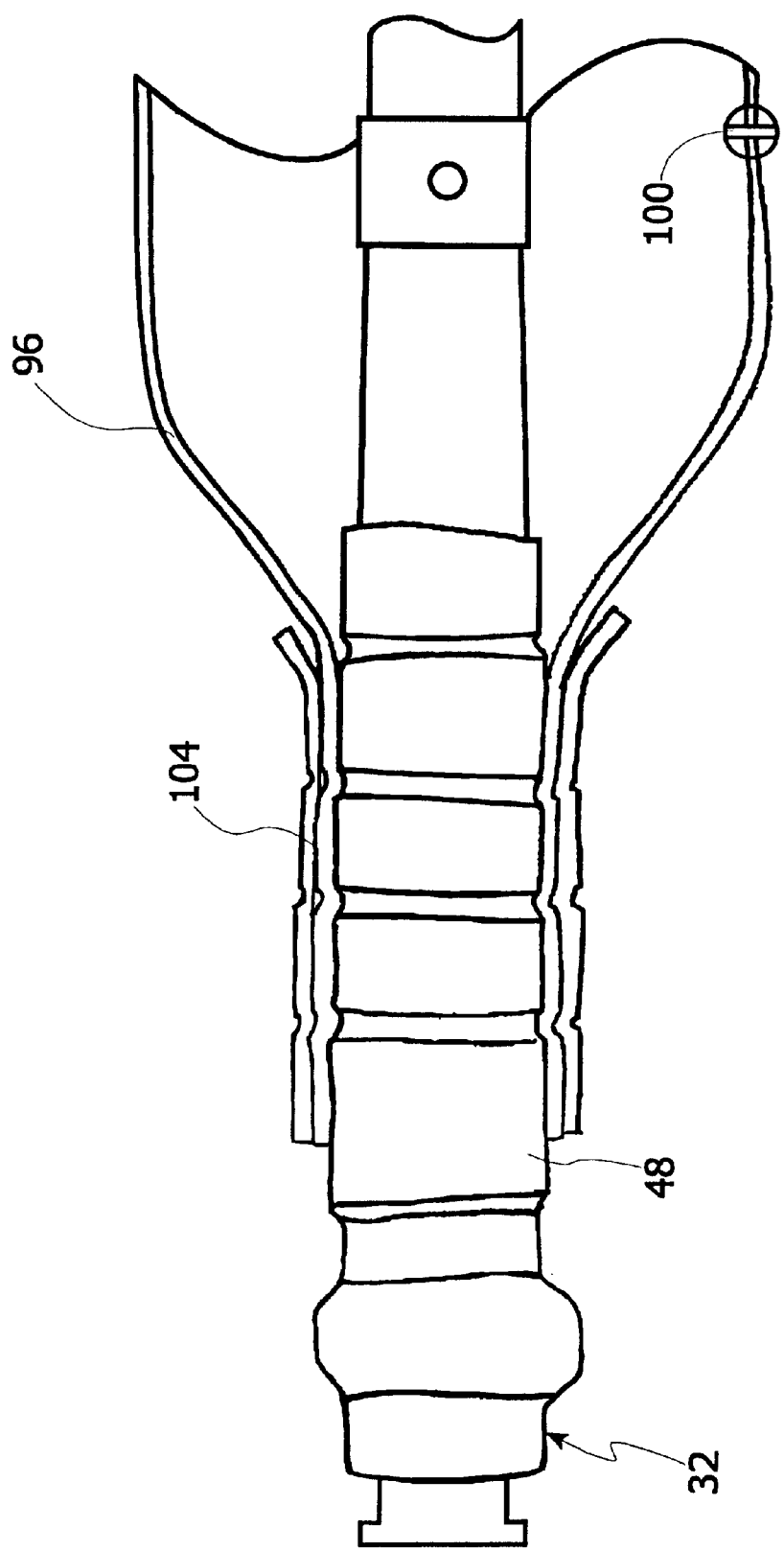
FIG. 2 schematically illustrates a longitudinal section of the inflator.
Figure 3:
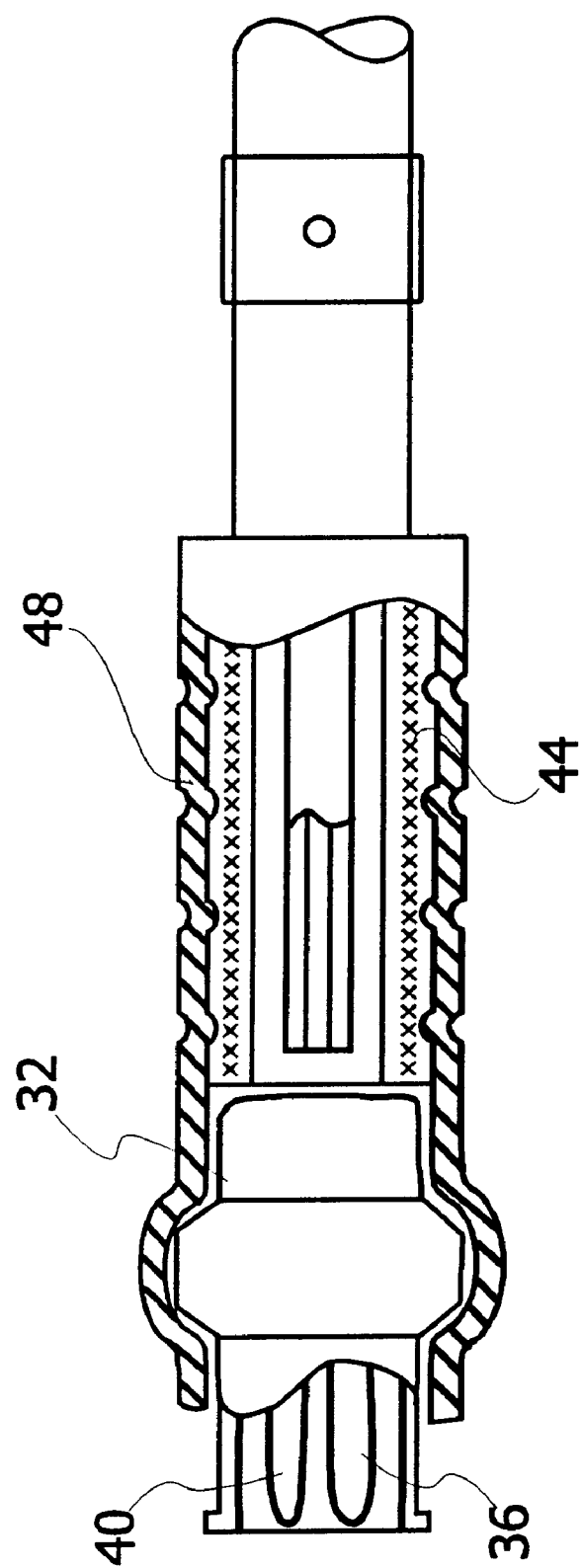
FIG. 3 schematically illustrates a longitudinal section of the inflator with portions cut-away, and without the timing member.
Figure 4:
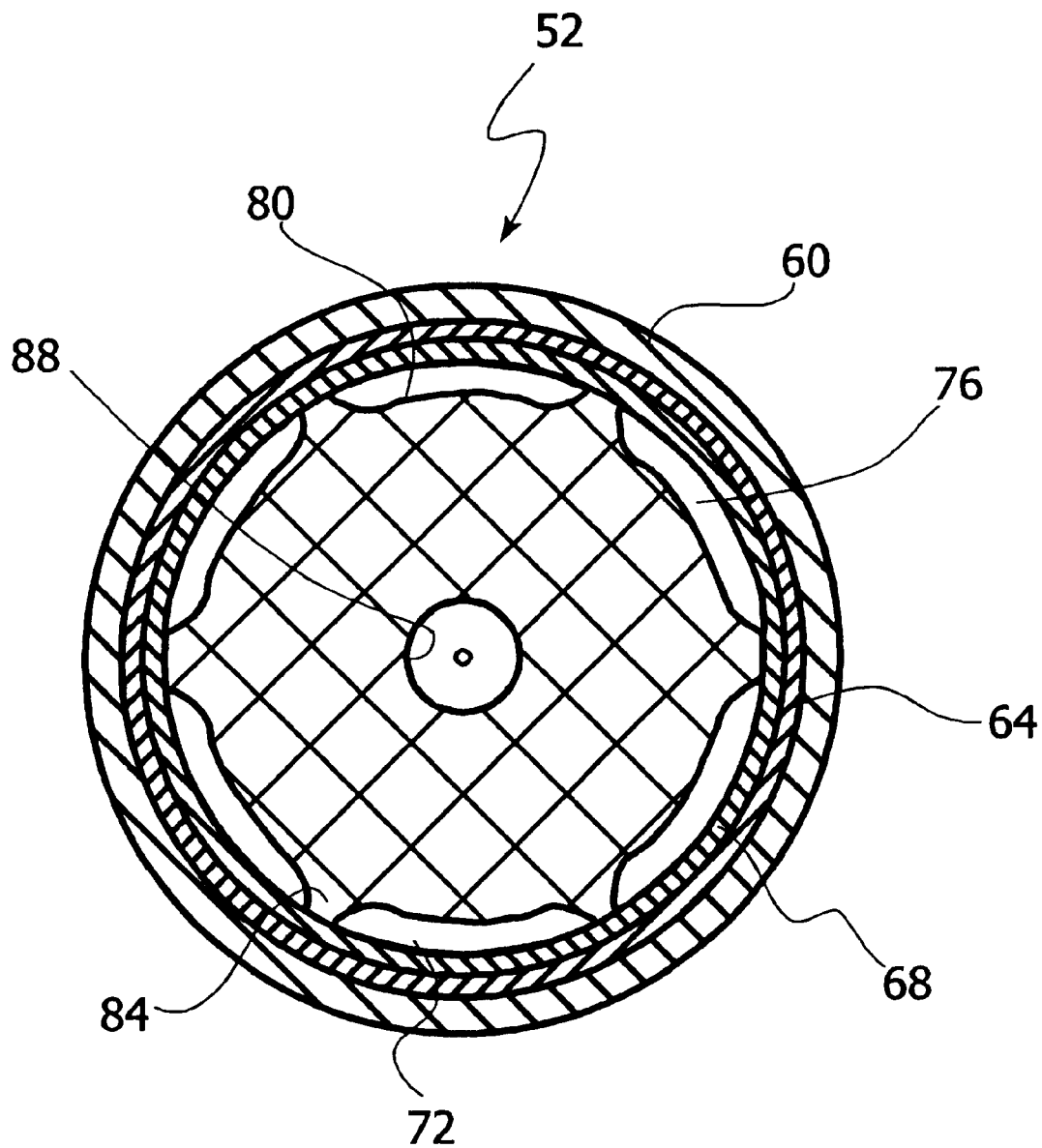
FIG. 4 illustrates a cross-sectional view of a confining member and propellant of the inflator.

With reference to FIGS. 2–4, as well as FIG. 1, the inflator 20 includes an initiator or activation assembly 32 for igniting the propellant 28. The initiator assembly 32 can be any one of a number of such well-known devices, such as that disclosed in U.S. Pat. No. 5,404,263, issued Apr. 4, 1995, entitled "All-Glass Header Assembly Used In An Inflator System" and assigned to the same assignee as the present invention. Briefly, the initiator assembly 32 includes a first conductive pin 36 and a second conductive pin 40, with the first conductive pin preferably being co-axial with the main housing or body of the initiator assembly 32. When an initiation or control signal is applied to the first conductive pin 36, the initiator assembly 32 is triggered to ignite the propellant 28. Such a control signal is indicative of the occurrence of a predetermined event related to a vehicle impact or collision, which initiates activation of the inflator 20.

The propellant 28 is located in close proximity to the initiator assembly 32 so that firing thereof results in ignition of the propellant 28 and the generation of products of combustion including inflation gases. The propellant 28 and the initiator assembly 32 are properly disposed relative to each other and held in place using a housing 48 that surrounds main portions of the initiator assembly 32 and at least portions of the propellant 28 adjacent to the initiator assembly 32. In one embodiment, the confining member 52 includes a metal ferrule that is crimped about the confining member 52.

With particular reference to FIG. 4, the inflator 20 includes a confining member or pressure tube 52 that includes at least one layer. The confining member 52 has a number of spaced holes 56 (FIGS. 6B–6D). Such holes 56 are preferably, uniformly spaced along the length of the confining member, which length extends for the length of the elongated propellant 28. With regard to formation of the holes 56, they are preferably created using weakened areas or seals covering the holes 56 in the confining member that are opened or removed when the propellant 28 combusts and after a predetermined internal pressure is achieved sufficient to rupture or open the seals. In another embodiment, the spaced holes 56 are pre-formed or already exist before combustion of the propellant. The confining member 52 is made of material that is strong and highly-resistant to rupture or breaking, especially when the propellant 28 is ignited. That is, the confining member 52 does not break into particles or pieces when the propellant 28 is ignited. The confining member 52 can withstand dynamic pressures of about 3000 psi and greater. The holes 56 allow for the escape of products of combustion including inflation gases, rather than having the confining member 52 fragment or break up, as will be explained further in connection with the discussion of the generation of a "combustion wave" when the elongated propellant 28 is ignited. The confining member 52 is also preferably made of a material that allows for expansion of the holes 56, such as at least the outer layer of the confining member 52 being an extruded plastic sheath. In such a case, the holes 56 have an unexpanded state or size and an expanded state or size. When the inflator 24 is activated and the propellant 28 is ignited, the holes 56 increase in size to at least about 10% greater than their areas in their unexpanded state. Preferably, such an increase in size is in the range of 50%–400% over the areas of the holes 56 in their unexpanded state, which exists before activation of the inflator 20.

With further reference to FIG. 4, the confining member 52, in one embodiment, is comprised of three layers including an outer layer 60, an intermediate layer 64 and an inner layer 68. The outer and inner layers 60,68 can both be extruded plastic sheaths and the intermediate layer 64 can be a braided reinforcement layer made of polyester, aramid, fiberglass or the like to withstand substantial pressures that are generated when the products of combustion are produced upon activation of the propellant 28.

The inner layer 68 of the confining member 52 has an inner wall 72 which is adjacent to the propellant 28. More specifically, a gap 76 having a gap area is defined between the inner wall 72 and an outer surface 80 of the propellant 28. In one embodiment, the space or distance between the inner wall 72 and the outer surface 80 of the propellant 28 is less than about 1 cm for at least a majority of the outer surface 80 of the propellant 28. The gap area defined by the gap 76 is useful in creating a desired combustion wave as will be explained later. As illustrated in FIG. 4, the gap 76 can be comprised of a series of open areas, with ridges 84 of the extruded propellant 28 separating such gap open areas. In addition to the gap 76, in one embodiment, the propellant 28 has a center bore 88 that is coaxial with the center longitudinal axis of the propellant 28. The center bore 88 is also useful in the propagation of the combustion wave that results when the propellant 28 is ignited.

In FIG. 4, the propellant 28 is illustrated as a single, elongated body of propellant. However, the propellant 28 may be comprised of two or more strands or pieces of propellant 28. It is necessary that each elongated propellant 28 meet a required length-to-diameter (L/D) ratio. Each such propellant 28 must have an L/D ratio of at least about 10, and preferably at least about 100, in order to provide a desired combustion wave. As should be appreciated, such an elongated propellant is linear in configuration and could be comprised of a number of propellant pieces that are arranged together in a linear manner.

With respect to the combustion wave, it refers to the essentially linear ignition of the elongated propellant beginning at its outer surface 80 and proceeding from a first end 60 of the elongated propellant, adjacent to the initiator assembly 32, and proceeding to the second or opposite end of the propellant 28. The propagation of this combustion wave must meet a minimum propagation rate, namely, a combustion of 100 meters of propellant/sec, and preferably about 500 meters/sec. If the propagation rate is less than this minimum rate, improper ignition of the propellant 28 occurs and there is unacceptable performance in pressurizing the inflatable 24 with inflation gases. The propagation of the combustion wave is influenced by a number of factors including the size of the center bore 88 and the size of the gap 76. In particular, the combination of the sizes of the gap 76 and center bore 88 must be within certain ranges relative to the cross-sectional area of the confining member 52 (inner diameter thereof). Preferably, the ratio of the cross-sectional area of the propellant to the cross-sectional area of the inner diameter of the confining member is in the range of 0.10–0.60 in order to achieve a desired propagation of the combustion wave. That is to say, above and below such a range there is sporadic failure to completely propagate along the length of the propellant 28.

Although only one confining member 52 with propellant 28 has been described, it should be understood that more than one combination of confining member 52 and propellant 28 could be utilized as part of a single inflator. Each such propellant in a separate confining member 52 could be individually, controllably ignited by its own initiator.

In addition to the propagation rate, a number of other parameters influence the desired or proper generation of the combustion wave including the sizes of the holes 56 and the strength of the confining member 52, as well as propellant ballistic properties (combustion temperature, pressure sensitivity, gas yield, gas composition and any other relevant property), and the conditioning temperature associated with the confining member 52.

With particular reference to FIG. 2, the inflator 20 also preferably includes a timing member or outer tube 96 having one or more metering orifices 100. When present, the timing member 96 is used to regulate the flow or passage of inflation gases generated by the propellant 28 from the inflator 20 to the inflatable 24. The timing member 96 is located outwardly of the confining member 52 and extends for a length at least about equal to that length of the confining member 52 along which there are spaced holes 56. The timing member 96 is joined to other portions of the inflator 20 at its ends. At the end of the timing tube 96 adjacent to the initiator assembly 32, in one embodiment, the timing member 96 is clamped or otherwise held to the housing 48 using a clamp member or other connector 104, which surrounds portions of the housing 48. The timing member 96 regulates the flow of inflation gases so that such inflation gases do not enter or inflate the inflatable 24 at too great a rate. Instead, the timing member 96 contributes to a uniform, smooth filling of the inflatable 24 with inflation gases using the one or more metering orifices 100 formed through the wall of the timing member 96. In one embodiment, there are a number of spaced metering orifices 100 that begin adjacent to the end of the timing member 96 near the propellant 28 and which are located along the length of the timing member 96. Such a configuration has particular utility in connection with uniform filling of an inflatable 24 having a relatively long length.

Although this embodiment has been described and illustrated as including the timing member 96, it should be understood that one or more other embodiments may not include such a timing member 96. In particular, a propellant composition and/or confining member (pressure tube) 52 may be provided that eliminates the need for such a timing member 96. For example, a propellant composition may be provided that combusts in such a way that the inflation gas flow regulating function associated with the timing member 96 is rendered unnecessary.

Like the confining member 52, the timing member 96 is preferably made of a non-metallic material, such as a reinforced plastic or rubber-like material. This contributes to an overall reduction in weight and cost associated with the inflator 20. Although it is preferred that the confining member 52 and the timing member 96 be made of materials that are substantially free of or do not have metal, they could include metallic portions. In the case of the confining member 52, regardless of the material used, it remains worthwhile to have a confining member 52 with spaced holes 56, either initially sealed or pre-formed, that are able to increase in size when the propellant 28 is activated and products of combustion are generated. Additionally, the timing member could be used with or contain multiple combinations of confining member 52 and propellant 28 to provide the multiple stage inflator in which each such propellant can be controllably activated at different times.

Figure 5:
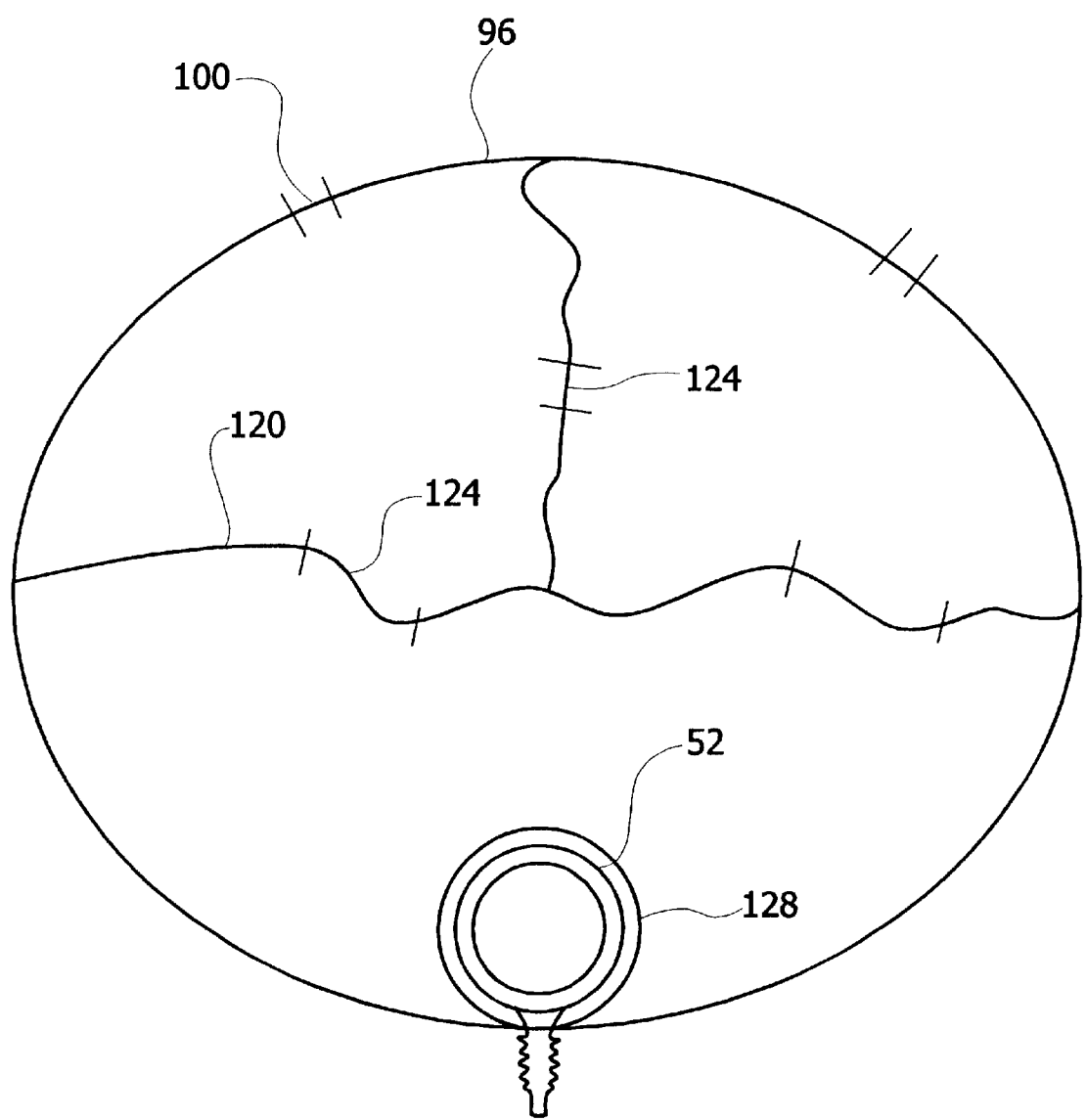
FIG. 5 illustrates membranes having heat absorbing surfaces attached to the inner wall of the timing member.

The timing member 96 also acts to remove excess heat from the generated gases by convection to the fabric surface of the timing member 96. If desired for a particular application, additional heat absorbing surfaces can be added by attaching non-structural membranes 120 to the inside of the timing member 96, as shown in the cross-section of FIG. 5. In this embodiment, a number of membranes 120 having openings 124 are attached to the inner wall of the timing member 96, such as by gluing, stitching or the like. The inflation gases from the confining member 52 pass through one or more of the openings 124 before exiting the metered orifices 100. The sizes of the openings 124 are typically greater than the sizes of the metered orifices 100. The membranes 120 have surfaces that are useful in absorbing heat as a result of the generated inflation gases. As also seen in FIG. 5, the confining member 52 is joined to inflator module hardware using a pressure tube mount 128 having portions located adjacent the circumference of the confining member 52. As can be further seen, parts of the outer wall of the pressure tube mount 128 are in contact with or tangent to the inner wall of the timing member 96.

Figure 8:
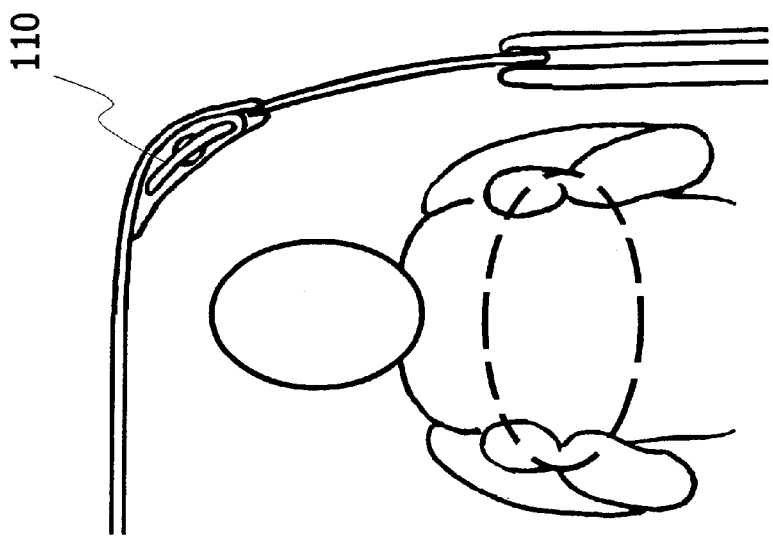
FIG. 8 schematically illustrates the curtain inflator of FIG. 7 in a front view.
Figure 7:
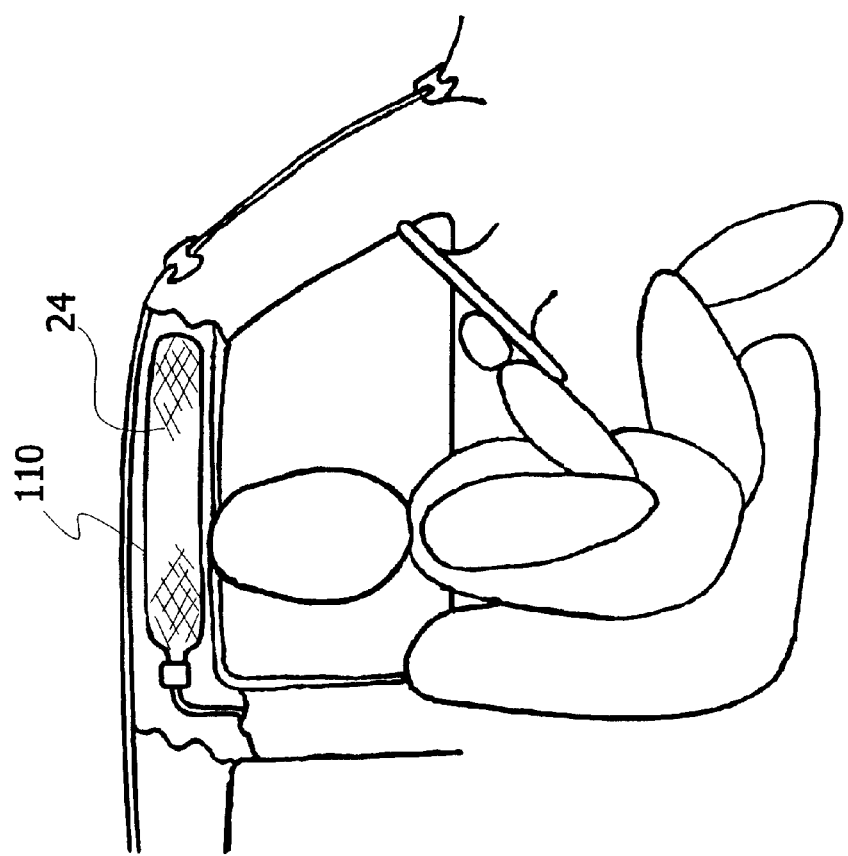
FIG. 7 schematically illustrates one application of the inflator as a curtain inflator with reference to a side view of a portion of a vehicle.

With regard to uniform filling of the inflatable 28, especially one that has a greater length, reference is made to FIGS. 6A–6D. This sequence of figures schematically illustrate inflation of the inflatable 24 when the initiator assembly 32 is fired and the propellant 28 is activated. In its quiescent or deactivated state, the propellant 28 has not yet been activated and no inflation gases have been generated. In FIG. 6B, an event has occurred that has caused the initiator assembly 32 to ignite the propellant 28, which thereby generates combustion products including inflation gases that exit the spaced holes 56 in the confining member 52, without essentially structurally rupturing or tearing the confining member 52. In the preferred embodiment, in FIG. 6B the holes 56 are unsealed upon combustion of the propellant. The inflation gases enter the chamber 102 of the timing member 96 and move radially outward from the outer layer 60 of the confining member 52 through the chamber 102 toward the wall of the timing member 96 as schematically illustrated in FIG. 6B. The inflation gases reach the wall and spaced metering orifices 100 of the timing member 96 and exit therethrough into the inflatable 24. As represented in FIG. 6C, there is a substantial uniform entry of inflation gases about the cross-section of the inflatable 24, as well as a uniform entry along the entire length of the inflatable 24. Such uniform entry of inflation gases is associated with a desired, regulated filling of the inflatable 24 by means of the predetermined spacing and sizing of the metering orifices 100. As seen in FIG. 6D, the inflatable 24 uniformly receives inflation gases and is uniformly filled or pressurized throughout its volume by means of the timing member 96. In accordance with this uniform filling, inflation gases directly from the inflator 20 are filling the entire inflatable 24, rather than inflation gases entering the inflatable 24 at a limited area such that, in order to complete filling of the inflatable 24, inflation gases in the inflatable 24 itself are required to move longitudinally within the inflatable 24 in order to achieve the desired force or pressure. Such non-uniform filling can result in the vehicle occupant being subjected to a less than desirable force due to the inflatable filling non-uniformly. With reference to FIGS. 7 and 8, one application of the inflator 20 is schematically illustrated. In such an application, the inflator 20 is used with an inflatable 24 that is located above one or more vehicle side windows. Such an inflator is commonly termed a "curtain" inflator. Such an inflator is particularly characterized by having a substantially greater length, particularly in comparison with driver, passenger, and side impact inflators. As seen in FIGS. 7 and 8, a curtain inflator module 110 is schematically shown above the driver side window. In this application, the inflator 20 is substantially elongated and has a length that is at least one-half the length of the inflatable 24 and preferably is substantially equal to the length of the inflator 20. Consequently, when the inflator 20 is activated to deploy or inflate the inflatable 24 of the curtain inflator module 110, there is a substantial uniform filling of the inflatable 24 along its length. The generation and entry of inflation gases to the inflatable 24 depend on achieving a minimum propagation rate associated with the combustion wave. That is to say, the filling of the inflatable 24 along its entire length at substantially the same time is limited by, or dependent on, the rate at which the elongated propellant 28 is ignited beginning at its end adjacent to the initiator assembly 32 and continuing to its opposite end.

Although the inflator 20 of the present invention has particular utility in connection with such a curtain inflator module 110, it should be understood that such an inflator 20 is useful in all types of vehicle inflators including driver, passenger, and side impact inflators. Based on the unique design, fewer parts and reduced manufacturing cost, such an inflator need not be dedicated to one application but can be configured for use as a driver, passenger, side impact and/or any other inflator. In addition, the present inventions described herein have applicability to more than inflators in a vehicle and are not to be limited thereto. These inventions can be employed in a number of applications that involve or require a gas generating apparatus. That is, the gas generating embodiments of the present invention have utility in a variety of applications where a generated gas performs one or more functions. For example, the gas generating functions can be used with vehicle pre-tensioner devices or other seatbelt hardware. The gas generating features can also be provided with systems found in aircraft or missiles where generated gases are required for certain functions.

It should also be understood that other uses or technical fields might employ certain benefits associated with the propellant composition disclosed herein. More specifically, a dispersal agent is disclosed as part of the propellant composition, which overcomes clumping or unacceptable composition formation problems by essentially mechanically dispersing portions of the composition that are included for binding purposes. Such a dispersal material need not be limited to propellant compositions. Such a dispersal material avoids or reduces the use of other materials, such as massive quantities of fluids for suspension of the fibrous materials, that are commonly used in avoiding such clumping problems (e.g., in paper making), but need to be removed (evaporated or strained therefrom) in order to complete the formation of the composition. The dispersal process disclosed herein can be beneficial in solving such clumping problems and achieving desired mixing, while avoiding use of excessive fluids as part of the mixture in providing the desired composition.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A gas generating apparatus, comprising:
a propellant for generating products of combustion including a gas;
a confining member located outwardly of said propellant and being adjacent thereto, said confining member including a plurality of spaced holes having an unexpanded state and an expanded state and in which the size of each of said holes in said expanded state is at least 10% greater than the size of each of said holes in said unexpanded state, said holes being defined by at least one of the following: (a) said holes being present before activation of said propellant; and (b) said holes being covered by weakened areas before activation of said propellant;
a timing member located outwardly of said confining member for regulating flow of gas; and
an ignition assembly for igniting said propellant and operatively joined to said propellant.

2. A gas generating apparatus, comprising:
a propellant for generating products of combustion including a gas;
a confining member located outwardly of said propellant and being adjacent thereto, said confining member having holes at least after activation of said propellant;
a timing member located outwardly of said confining member for regulating flow of gas;
an ignition assembly for igniting said propellant and operatively joined to said propellant; and
at least one membrane extending from an inner wall from said timing member inwardly thereof and in which said at least one membrane absorbs heat from the gas.

3. A gas generating apparatus that can be operably connected to an inflatable, comprising:
a propellant for generating products of combustion including at least a propellant gas when activated;
a confining member surrounding said propellant, said confining member allowing passage of the propellant gas;
a timing member located outwardly of said confining member and including a number of orifices for regulating flow of the propellant gas, at least a majority of each of said confining member and said timing member being disposed inside of the inflatable when the gas generating apparatus is operably connected to the inflatable; and
an ignition assembly for igniting said propellant and operatively joined thereto;
wherein each of said number of timing member orifices separately communicates with the inflatable and in which the propellant gas flows substantially radially from each of said orifices into the inflatable.

4. An apparatus, as claimed in claim 3, wherein:
said confining member is made of a material that withstands a pressure of at least about 3,000 psi.

5. An apparatus, as claimed in claim 3, wherein:
each of said confining member and said timing member is substantially non-metallic.

6. An apparatus, as claimed in claim 3, wherein:
said propellant includes a fuel-rich material, an oxidizer material and a porosity-producing material.

7. An apparatus, as claimed in claim 3, wherein:
said propellant has a cross-sectional area and said confining member has an inner diameter with a cross-sectional area that defines a ratio of said cross-sectional area of said propellant to said cross-sectional area of said inner diameter of said confining member being in the range of about 0.10–0.60.

8. An apparatus, as claimed in claim 3, wherein:
said propellant has an oxidizer material that includes ammonium nitrate.

9. An apparatus, as claimed in claim 3, wherein:
said propellant includes a uniform mixture of a fuel-rich material, an oxidizer material and a porosity-producing composition.

10. An apparatus, as claimed in claim 3, further including:
at least one membrane joined to said timing member and extending inwardly thereof for absorbing heat from the gas.

11. A gas generating apparatus, comprising:
a propellant for generating products of combustion including at least one gas when activate;,
a confining member surrounding said propellant, said confining member allowing passage of the gas;
a timing member located outwardly of said confining member and including a number of metering orifices for regulating flow of the gas; and
an ignition assembly for igniting said propellant and operatively joined thereto;
wherein said propellant has a cross-sectional area and said confining member has an inner diameter with a cross-sectional area, a ratio being defined by said cross-sectional area of said propellant to said cross-sectional area of said inner diameter of said confining member, said ratio being in the range of about 0.10–0.60 and in which a gap area is disposed between said cross-sectional area of said propellant and said inner diameter cross-sectional area of said confining member and a center bore is disposed interiorly of said cross-sectional area of said propellant.

12. A gas generating apparatus, comprising:
a propellant including a first end and a second end and having an outer surface and a length, said propellant for generating products of combustion including a propellant gas;
a confining member located outwardly of said propellant and being adjacent thereto, said confining member allowing passage of the propellant gas;
at least one of: (a) a bore devoid of propellant located inwardly of said outer surface of said propellant and extending along at least portions of said length of said propellant and (b) a gap located between said confining member and said outer surface of said propellant and extending along at least portions of said length of said propellant;

a timing member located outwardly of said confining member for regulating flow of gas; and an ignition assembly for igniting said propellant and operatively joined to said propellant;

wherein, after activation of said propellant, a combustion wave is generated in which ignition of said propellant proceeds from said first end of said propellant to said second end thereof, said combustion wave having a propagation rate of at least 100 meters of said propellant/second and in which said propagation rate of said combustion wave is a function of said at least one of said bore and said gap.

13. An apparatus, as claimed in claim 12, wherein:

said propellant has a length-to-diameter ratio and said ratio is at least about 100 in providing said combustion wave.

* * * * *